United States Patent Office 3,816,569
Patented June 11, 1974

---

3,816,569
O-PHENYL S-ARYL ALKYLPHOSPHONO-DITHIOATES
John P. Chupp, Kirkwood, Mo., assignor to
Monsanto Company, St. Louis, Mo.
No Drawing. Continuation-in-part of abandoned application Ser. No. 11,912, Feb. 16, 1970. This application June 2, 1972, Ser. No. 258,969
Int. Cl. A01n 9/36; C07f 9/40
U.S. Cl. 260—961                 12 Claims

ABSTRACT OF THE DISCLOSURE

S-aryl O-phenyl alkylphosphonodithioates are useful as insecticides. In particular, S-(p-tolyl) O-phenyl methylphosphonodithioate for use in combating soil insects of the genus *Diabrotica*.

---

This application is a continuation-in-part of copending U.S. application Ser. No. 11,912, filed Feb. 16, 1970, now abandoned.

This invention relates to S-aryl O-phenyl alkylphosphonodithioates of the formula $$(R)_n\text{-C}_6H_4\text{-S-P(=S)(R')-O-C}_6H_5$$

wherein R is methyl or tertiary butyl, n is an integer from 0 to 2, and R' is lower alkyl provided that when R is tertiary butyl, R' is ethyl. It is preferred that when n is 2, R is methyl.

As employed herein, the term "lower alkyl" designates those groups wherein the aliphatic chain is straight or branched and has from 1 through 4 carbons inclusive. Preferred lower alkyl are ethyl and methyl.

As employed herein, the term "aryl" designates those groups which are phenyl or alkyl-substituted phenyl, such as tolyl, xylyl, or tertiary-butyl phenyl.

A preferred embodiment of this invention relates to S-(p-tolyl) O-phenyl methylphosphonodithioate

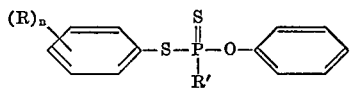

for combating soil insects of the genus *Diabrotica*. This compound, a light yellow oil, is readily prepared by known methods, for example, by refluxing a substantially equimolecular mixture of O-phenyl methylphosphonothionochloride, p-thiocresol and triethylamine in benzene. It is soluble in acetone. This compound as distinguished from many analogues thereof exhibits a high degree of soil stability. Other preferred compounds of this invention which also exhibit outstanding soil stability are S-(p-tolyl) O-phenyl ethylphosphonodithioate and S-(m-tolyl) O-phenyl ethylphosphonodithioate.

S-(p-tolyl) O-phenyl ethylphosphonodithioate has the formula

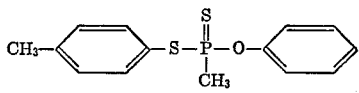

The white solid compound is prepared by known methods, for example, by refluxing a substantially equimolecular mixture of O-phenyl ethylphosphonothionochloride, p-thiocresol and triethyl amine in benzene. It has a melting point of about 46 to 48 degrees Centigrade. (° C.), is insoluble in water and soluble in acetone.

S-(m-tolyl) O-phenyl ethylphosphonodithioate has the formula

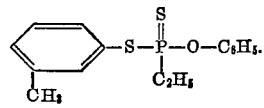

The white solid compound is prepared by known methods, for example, by refluxing a substantially equimolecular mixture of O-phenyl ethylphosphonothionochloride, m-thiocresol and triethyl amine in benzene. It is identified by nuclear magnetic resonance and elemental analysis and found to be insoluble in water and soluble in acetone.

Some of the other compounds of this invention which may be prepared similarly by reacting the appropriate thiophenol or alkyl-substituted thiophenol with the appropriate phosphonothionochloride are as follows:

S-(2,4-xylyl) O-phenyl ethylphosphonodithioate

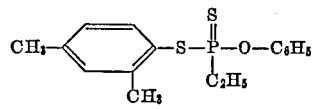

white solid—melting point (m.p.) 62–68° C.

S-(m-tolyl) O-phenyl methylphosphonodithioate

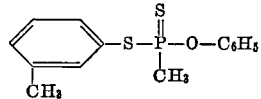

white solid—m.p. 61–64° C.

S-(o-tolyl) O-phenyl methylphosphonodithioate

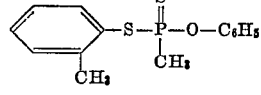

white solid.

S,O-diphenyl ethylphosphonodithioate

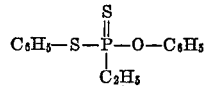

white solid—m.p. 105–112° C.

S-(o-tolyl) O-phenyl ethylphosphonodithioate

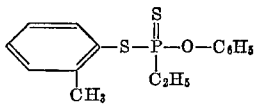

white solid—m.p. 53.5–55° C.

S-(p-tertiary butylphenyl) O-phenyl ethylphosphonodithioate

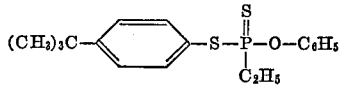

white solid—m.p. 64–66.5° C.

S-(2,4-xylyl) O-phenyl methylphosphonodithioate

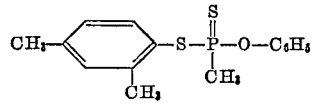

yellow liquid.

Various important crop plants are subject to attack by the larval stage of soil insects of the genus *Diabrotica*, for example, the northern corn rootworm, *Diabrotica longicornis* and the western corn rootworm, *Diabrotica virgifera*, which feed specifically on the root system of corn plants, the southern corn rootworm (or spotted cucumber beetle), *Diabrotica undecimpunctata howardi* which attacks cucurbits, peanut pods, and also roots of corn plants, and the banded cucumber beetle, *Diabrotica balteata* which attacks root systems of sweet potatoes. The larval stage of these insects attack or eat all of the smaller roots of infested plants and form tunnels in the larger roots, thereby weakening or destroying them. Corn plants. growing in fields infested with the northern or western corn rootworms exhibit poor growth and often die and the larger plants because of their weakened root system often fall down during or after a heavy rainfall or a strong wind. In addition these soil insects seriously affect the quality of the harvested crop, particularly corn.

In accordance with this invention it has been found that soil insect species of the genus *Diabrotica* are successfully combated by bringing into contact with the larval stage thereof, as for example, applying to the surface or sub-surface of the host soil such as cornfields, peanut fields, etc., an insecticidally effective amount of a phosphonodithioate of this invention.

To illustrate this invention is the following:

120 grams of unsterilized Ray silt-loam soil (St. Charles, Mo.) having a moisture content of 11 percent by weight is placed in a shallow pan. A 0.01 percent by weight acetone solution of S-(p-tolyl) O-phenyl methylphosphonodithioate is prepared and 7.2 ml. thereof is pipetted into a Devilbiss atomizer, and sprayed evenly over said soil, the soil being worked during the spraying to provide an even distribution of the chemical in the soil, which provides a concentration of 6 p.p.m. of S-(p-tolyl) O-phenyl methylphosphonodithioate in the so treated soil. Thereupon to each of 8 No. 5175 plastic creamer cups is added 18 grams of the so treated soil. These so filled cups are then grouped in respective pairs (a), (b), (c) and (d).

To each cup of pair (a) is added and intimately mixed with the treated soil therein two freshly cut one inch long sections of the roots of healthy young corn plants (*Zea-mays*), the length of the roots thereof being about 10 inches. Immediately thereafter, on the surface of the soil of each cup of pair (a) is placed five 10 day old western corn rootworm larvae, *Diabrotica virgifera*, and each cup capped with a plastic top pin-holed for aeration purposes. This pair (a) is then placed in a constant temperature humidity box (25° C., 70% relative humidity). At the same time respective cup pairs (b), (c) and (d) above described are capped and placed in the same humidity box.

Forty-eight hours immediately after placement in the humidity box pair (a) cups are removed, and the contents of each cup poured into separate 600 ml. glass beakers each containing 200 ml. of a saturated aqueous magnesium sulfate solution. The contents of each beaker is swirled about for about 5 minutes, and then the beaker is permitted to stand. The soil settles to the bottom of the beaker, while the larvae whether alive or dead rise to and float on the top surface. Thereupon the live larvae in each beaker are counted and averaged. In each beaker it was observed that of the five floating larvae there were no live larvae, all five were dead, in other words a 100 percent kill in each instance.

Each cup of pair (b) above described is removed from the humidity box 3 weeks immediately after their initial placement therein as described above. To each cup of pair (b) is added and intimately mixed with the treated soil therein two freshly cut one inch long sections of the roots of healthy young corn plants (*Zea mays*), the length of the roots being about 10 inches. Immediately thereafter, on the surface of the soil of each cup of pair (b) is placed five 10 day old western corn rootworm larvae, *Diabrotica virgifera*, and each cup capped with a plastic top pin-holded for aeration purposes. This pair (b) is then placed back in the aforedescribed humidity box. Forty-eight hours immediately after this placement pair (b) cups are removed, and the contents of each cup is poured into separate 600 ml. glass beakers each containing 200 ml. of a saturated aqueous magnesium sulfate solution. The contents of each breaker is swirled about for about 5 minutes, and then permitted to stand. The soil settles to the bottom of the beaker, while the larvae whether dead or alive rise to and float on the top surface. Thereupon the live larvae in each beaker are counted and averaged. In each breaker it was observed that of the five floating larve there were no live larvae, all five were dead, in other words a 100 percent kill in each instance.

Each cup of pair (c) above described is removed from the humidity box above described 4 weeks immediately after their initial placement therein as described above. To each cup of pair (c) is added and intimately mixed with the treated soil therein two freshly cut one inch long sections of the roots of healthy young corn plants (*Zea mays*), the length of the roots being about 10 inches. Immediately thereafter, on the surface of the soil of each cup of pair (c) is placed five 10 day old western corn rootworm larvae, *Diabrotica virgifera*, and each cup capped with a plastic top pin-holed for aeration purposes. This pair (c) is then placed back in the aforedescribed humidity box. Forty-eight hours immediately after this placement pair (c) cups are removed, and the contents of each cup is poured into separate 600 ml. glass beakers each containing 200 ml. of a saturated aqueous magnesium sulfate solution. The contents of each beaker is swirled about for about 5 minutes and then permitted to stand. The soil settles to the bottom of the beaker, while the larvae whether dead or alive rise to and float on the top surface. Thereupon the live larvae in each beaker are counted and averaged. In each beaker it was observed that of the five floating larvae, there was no live larvae, all five were dead, in other words a 100 percent kill in each instance.

Each cup of pair (d) above described is removed from the humidity box above described 8 weeks immediately after their initial placement therein as described above. To each cup of pair (d) is added and intimately mixed with the treated soil therein two freshly cut one inch long sections of the roots of healthy young plants (*Zea mays*), the length of the roots being about 10 inches. Immediately thereafter on the surface of the soil of each cup of pair (d) is placed five 10 day old western corn rootworm larvae, *Diabrotrica virgifera*, and each cup capped with a plastic top pin-holed for aeration purposes. This pair (d) is then placed back in the aforedescribed humidity box. Forty-eight hours immediately after this placement pair (d) cups are removed, and the contents of each cup is poured into separate 600 ml. of glass beakers each containing 200 ml. of a saturated aqueous magnesium sulfate solution. The contents of each beaker is swirled about for about 5 minutes and then permitted to stand. The soil settles to the bottom of the beaker, while the larvae whether dead or alive rise to and float on the top surface. Thereupon the live larvae are counted and averaged. In one beaker it was observed that of the five floating larvae, there was one alive (or 80% kill) while in the other beaker it was observed that of the five floating larvae two were alive (or 60% kill), which averages a 70 percent kill.

Along with the above-described evaluations of 48 hours, 3, 4 and 8 weeks control pairs were also run, that is everything was exactly the same except that the soil was not treated with S-(p-tolyl) O-phenyl methylphosphonodithioate. In all of these instances no kills of the larvae were observed.

As is evident S-(p-tolyl) O-phenyl methylphosphonodithioate is characterized by excellent soil stability, that is its longevity in soil is sufficiently great to cope with corn rootworm infestations occurring in the soil at periods substantially later than its initial application to the soil.

Following the above test procedure the insecticidal effectiveness of other compounds of this invention is shown by the results summarized in Table 1.

90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable

TABLE 1

| Example | Compound | Formula | Percent kill in test after— | | | | | | |
|---|---|---|---|---|---|---|---|---|---|
| | | | 0 wks. | 2 wks. | 4 wks. | 6 wks. | 8 wks. | 10 wks. | 12 wks. |
| (a) | S-(p-tolyl) O-phenyl ethylphosphonodithioate. | 10 percent by weight on attapulgite granules. | — | 100 | 100 | 80 | 100 | 90 | 80 |
| (b) | S-(m-tolyl) O-phenyl ethylphosphonodithioate. | do | — | 100 | 90 | 100 | 90 | 100 | 80 |
| (c) | S,O-diphenyl ethylphosphonodithioate | 0.01 percent by weight in acetone | 100 | 80 | 90 | — | 80 | — | 60 |

— Indicates no test.

The results in Table 1 indicate that the soil stability of the designated compounds is also excellent. The compounds of Examples (a) and (b) have superior soil stability and are particularly effective even after long periods of time.

Insecticidal effectiveness against corn rootworm infestations upon initial application at the rate of 10 p.p.m. to the soil is observed for S-(m-tolyl) O-phenyl methylphosphonodithioate and S-(o-tolyl) O-phenyl methylphosphonodithioate which give an 80 percent kill and S-(o-tolyl) O-phenyl ethylphosphonodithioate, S-(2,4-xylyl) O-phenyl ethylphosphonodithioate, S-(p-tertiary butyl phenyl) O-phenyl ethylphosphonodithioate, and S - (2,4-xylyl) O-phenyl methylphosphonodithioate which give a 100 percent kill.

Although a compound of this invention is useful per se in destroying species of Diabrotica larvae, it is preferable that it be supplied to the larvae or to the environment of the larvae in a dispersed form in a suitable extending agent. The exact concentration of an insecticidal compound employed in destroying said larvae can vary considerably provided the required dosage (i.e. toxic or insecticidal amount) thereof is supplied to the larvae or to the environment of the larvae. When the extending agent is a liquid or mixture of liquids (e.g. as in solutions, suspensions, emulsions, or aerosols) the concentration of the insecticidal compound employed to supply the desired dosage generally will be in the range of 0.001 to 50 percent by weight. When the extending agent is a semi-solid or solid, the concentration of the insecticidal compound employed to supply the desired dosage generally will be in the range of 0.1 to 75 percent by weight. From a practical point of view, the manufacturer must supply the user with a low cost concentrate or spray base or particulate solid base in such form that, by merely mixing with water or finely divided inert solid extender (e.g. powdered clay or talc) or other low cost material available to the user at the point of use, he will have an easily prepared insecticidal spray or particulate solid. In such a concentrate composition, the insecticidal compound generally will be present in a concentration of 5 to 95 percent by weight, the residue being any one or more of the well-known insecticidal adjuvants, such as the surface-active clays, solvents, diluents, carrier media, adhesives, spreading agents, humectants, and the like, but particularly a finely-divided solid extender.

There are a large number of organic liquids which can be used for the preparation of solutions, suspensions or emulsions of the insecticidal compounds of this invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above about 80 percent and preferably above 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g. an aromatic hydrocarbon and an aliphatic ketone.

When an insecticidal compound of this invention is to be supplied to the larvae or to the environment of the larvae as aerosols, it is convenient to dissolve it in a suitable solvent and disperse the resulting solution in dichlorodifluoromethene or like chlorofluoroalkane which boils below room temperature at atmospheric pressure.

The insecticidal compounds of this invention are preferably supplied to the larvae or to the environment of the larvae in the form of emulsions or suspensions. Emulsions or suspensions are prepared by dispersing the insecticidal compounds of this invention either per se or in the form of an organic solution thereof in water with the aid of a water-soluble non-ionic or anionic surfactant or mixtures thereof. The term "surfactant" as employed here and in the appended claims is used as in vol. II of Schwartz, Perry and Berch's "Surface Active Agents and Detergents" (1958, Interscience Publishers, Inc., New York) in place of the expression "emulsifying agent," to cannote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," 2nd ed., p. 280). The surfactants contemplated are the well-known capillary active substances which are non-ionic or anionic and which are described in detail in vols. I and II of Schwartz, Perry and Berch's "Surface Active Agents and Detergents" (1958, Interscience Publishers, Inc., New York) and also in the November 1947 issue of Chemical Industries (pp. 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to non-ionizing capillary active substances are incorporated in this specification by reference in order to avoid unnecessary enlargement of this specification. The preferred surfactants are the water soluble anionic and non-ionic surface active agents set forth in U.S. 2,846,398 (issued Aug. 5, 1958).

The insecticidal compounds of this invention can be dispersed by suitable methods (e.g. tumbling or grinding) in solid extending agents either of organic or inorganic nature and supplied to the larvae environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. pentonite. These mixtures can be used for insecticidal purposes in the dry form, or by addition of water-soluble anionic or non-ionic surfactants the dry particulate solids can be rendered wettable by water so as to obtain stable aqueous dispersions or suspensions suitable for use as sprays.

For special purposes the insecticidal compounds of this invention can be dispersed in a semi-solid extending agent such as petrolatum with or without the aid of solubilities promoters and/or surfactants.

In all of the forms described above the dispersions can be provided ready for use in combating the larvae or they can be provided in a concentrated form suitable for mixing with or dispersing in other extending agents. As illustrative of a particularly useful concentrate is an intimate mixture of S-(p)-tolyl) O-phenyl methylphosphonodithioate with a water-soluble anionic or non-ionic surfactant or mixtures thereof which lowers the surface tension of water in the weight proportions of 0.1 to 15 parts of surfactant with sufficient of the insecticidal compound of this invention to make 100 parts by weight. Such a concentrate is particularly adapted to be made into a spray for combating various forms of the aforedescribed larvae by the addition of water thereto. As illustrative of such a concentrate is an intimate mixture of 20 parts by weight of S-(p-tolyl) O-phenyl methylphosphonodithioate and from 2 to about 4 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for combating the aforedescribed larvae is a solution (preferably as concentrated as possible) of the insecticidal compound of this invention in an organic solvent therefor. The said liquid concentrate preferably contains dissolved therein a minor amount (e.g. 0.5 to 10 percent by weight of the weight of the new insecticidal agent) of a non-ionic or anionic surfactant, which surfactant is also water-soluble. As illustrative of such a concentrate is a solution of S-(p-tolyl) O-phenyl methylphosphonodithioate in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

The insecticidal compounds of this invention can also be advantageously employed in combination with other pesticides, including, for example, nematocides, bactericides, fungicides, and heribicides. In this manner it is possible to obtain mixtures which are effective against a wide variety of pests and other forms of noxious life.

In the destruction of the aforedescribed larvae the insecticidal compounds of this invention either per se or compositions comprising same are supplied to the larvae or to their environment in a toxic or insecticidal amount. This can be done by dispersing the new insecticidal agents per se or compositions comprising same in, on or over an infested environment or in, on or over an environment the larvae frequent, e.g. agricultural soil or other growth media or other media attractable to the larvae for habitational or sustenance purposes, in any conventional fashion which permits the larvae to be subject to the insecticidal action of the insecticidal compound of this invention. Such dispersing can be carried out by simply mixing the new insecticidal agent per se or insecticidal spray or particulate solid compositions comprising same with the infested environment or with the environment the larvae frequent, or by employing a liquid carrier for the new insecticidal agent to accomplish sub-surface penetration and impregnation therein.

What is claimed is:

1. A compound of the formula

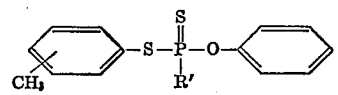

wherein R' is lower alkyl.

2. A compound of claim 1 wherein R' is methyl.
3. The compound of claim 2 which is S-(p-tolyl) O-phenyl methylphosphonodithioate.
4. A compound of claim 1 wherein R' is ethyl.
5. The compound of claim 4 which is S-(p-tolyl) O-phenyl ethylphosphonodithioate.
6. The compound of claim 4 which is S-(m-tolyl) O-phenyl ethylphosphonodithioate.
7. A compound of the formula

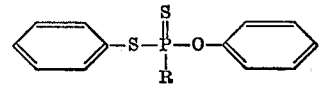

wherein R' is lower alkyl.

8. The compound of claim 7 which is S,O-diphenyl ethylphosphonodithioate.
9. A compound selected from the group consisting of S-(2,4-xylyl) O-phenyl ethylphosphonodithioate, S-(2,4-xylyl) O-phenyl methylphosphonodithioate and S-(p-tertiary butylphenyl) O-phenyl ethylphosphonodithioate.
10. The compound of claim 9 which is S-(2,4-xylyl) O-phenyl ethylphosphonodithioate.
11. The compound of claim 9 which is S-(2,4-xylyl) O-phenyl methylphosphonodithioate.
12. The compound of claim 9 which is S-(p-tertiary butylphenyl) O-phenyl ethylphosphonodithioate.

References Cited
UNITED STATES PATENTS
3,361,855   1/1968   Schrader _____ 260—961 X ANTON H. SUTTO, Primary Examiner U.S. Cl. X.R.
260—973; 424—222